(12) United States Patent
Larray et al.

(10) Patent No.: US 9,676,263 B2
(45) Date of Patent: Jun. 13, 2017

(54) ELECTRICALLY POWERED CYCLES AND AUTOMATIC STORAGE SYSTEM FOR SUCH CYCLES

(71) Applicant: JCDecaux SA, Neuilly Sur Seine (FR)

(72) Inventors: Sylvain Larray, Elancourt (FR); Jean-Marc Forrestier, Montigny le Bretonneux (FR)

(73) Assignee: JCDECAUX SA, Neuilly sur Seine (FR)

( * ) Notice: Subject to any disclaimer, the term of this patent is extended or adjusted under 35 U.S.C. 154(b) by 0 days.

(21) Appl. No.: 14/877,330

(22) Filed: Oct. 7, 2015

(65) Prior Publication Data

US 2016/0107517 A1 Apr. 21, 2016

(30) Foreign Application Priority Data

Oct. 20, 2014 (FR) ..................... 14 60057

(51) Int. Cl.
| | | |
|---|---|---|
| *B60K 1/04* | (2006.01) | |
| *B62K 11/00* | (2006.01) | |
| *B60L 11/18* | (2006.01) | |
| *B62K 21/12* | (2006.01) | |
| *B62H 3/00* | (2006.01) | |
| *B62H 5/20* | (2006.01) | |
| *B62J 99/00* | (2009.01) | |

(52) U.S. Cl.
CPC ............ *B60K 1/04* (2013.01); *B60L 11/1822* (2013.01); *B60L 11/1879* (2013.01); *B62H 3/00* (2013.01); *B62H 5/20* (2013.01); *B62K 11/00* (2013.01); *B62K 21/12* (2013.01); *B60K 2001/0494* (2013.01); *B62H 2003/005* (2013.01); *B62J 2099/0033* (2013.01); *B62K 2204/00* (2013.01)

(58) Field of Classification Search
CPC .......... B62K 1/04; B62K 11/00; B62K 21/12; B62L 11/1822; B60L 11/1879; B62H 3/00; B62H 5/20
USPC ......................................................... 180/220
See application file for complete search history.

(56) References Cited

U.S. PATENT DOCUMENTS

| | | | |
|---|---|---|---|
| 2004/0163479 A1* | 8/2004 | Kinoshita ............... | B62J 99/00 73/856 |
| 2005/0035856 A1* | 2/2005 | McMahon ............. | B62K 11/14 340/539.11 |

FOREIGN PATENT DOCUMENTS

| | | |
|---|---|---|
| EP | 0403978 | 12/1990 |
| EP | 2426042 | 3/2012 |
| EP | 2676874 | 12/2013 |
| FR | 3003537 | 9/2014 |
| GB | 607476 | 8/1948 |
| GB | 2419459 | 4/2006 |

(Continued)

OTHER PUBLICATIONS

Search Report for related French Application No. FR 14 60057; report dated Jul. 3, 2015.

*Primary Examiner* — Jacob Knutson
(74) *Attorney, Agent, or Firm* — Miller, Matthias & Hull LLP

(57) ABSTRACT

An electrically powered cycle comprising a detachable battery mounted by sliding on two rails of a battery receptacle located on the central portion of the handlebar. The rails are inclined downward and rearward and the battery is inserted into the receptacle by sliding the battery from the upper front end of the rails. The battery is facing the user and visible to the user. The rails also serve to connect the battery electrically.

14 Claims, 5 Drawing Sheets

(56) References Cited

FOREIGN PATENT DOCUMENTS

| IL | EP 0403978 A2 * | 12/1990 | ............ A61G 5/045 |
|----|----|----|----|
| JP | 2001122179 | 5/2001 | |
| JP | 2002127967 | 5/2002 | |

* cited by examiner

ELECTRICALLY POWERED CYCLES AND AUTOMATIC STORAGE SYSTEM FOR SUCH CYCLES

CROSS-REFERENCE TO RELATED APPLICATION

This application claims priority under the Paris Convention to French Patent Application No. 14 60057 filed on Oct. 20, 2014.

FIELD OF THE DISCLOSURE

The present invention relates to electrically powered cycles and to automatic storage systems for such cycles.

BACKGROUND OF THE DISCLOSURE

More particularly, the invention relates to an electrically powered cycle comprising:
 a frame having a saddle,
 at least one rear wheel rotatably mounted on the frame,
 a front wheel rotatably mounted on a fork integral to a handlebar, the front wheel defining a direction of advancement of the cycle, the handlebar having a central portion hinged to the frame and two lateral arms with handles,
 a removable rechargeable battery having a flattened shape and comprising:
  first and second main faces defining a thickness of the battery between them,
  two opposing first sides,
  two opposing second sides,
 a receptacle for receiving said battery and connecting it electrically, the receptacle being on the central portion of the handlebar, the receptacle comprising two parallel lateral flanges facing one another, extending along the direction of advancement of the cycle between a back end and a front end, the receptacle being open at the front end of the lateral flanges, the receptacle being shaped to permit slotting the first sides of the battery by sliding the battery rearward on the lateral flanges of the receptacle starting from the front end of said lateral flanges, the receptacle being shaped to limit the rearward sliding of the battery when said battery is engaged in the receptacle, and the receptacle being shaped so that a user seated on the saddle can see at least part of the battery when said battery is engaged in said receptacle.

Document GB2419459A discloses an example of such a cycle, where the receptacle is substantially horizontal and is closed at the back end of the lateral flanges, said back end being provided with an electrical connector which allows connecting the battery.

SUMMARY OF THE DISCLOSURE

The present invention is intended to further improve cycles of the aforementioned type, particularly in a manner that improves their efficiency and ergonomics.

To this end, according to the invention, a cycle storage of the kind in question is characterized in that: said front end is raised relative to said back end in the normal usage position of the cycle, the receptacle being open at the back end of the lateral flanges, and in that the lateral flanges of the receptacle comprise electrical connectors suitable for engaging with complementary connectors that are part of the battery, in order to connect the battery electrically to an electrical circuit that is part of the cycle, when the battery is engaged in the receptacle.

This arrangement of the receptacle improves the ergonomics of the device, in particular since:
 it facilitates insertion and removal of the battery, as the battery inserts itself by its own weight,
 it provides the user with better verification of the presence and correct positioning of the battery, which is more visible to the user (thus also reducing the risks of theft of the battery or of forgetting the battery when leaving the cycle on the street, as the battery is more visible to the user),
 the receptacle is easy to clean,
 it prevents stagnation of water in the receptacle and fouling of the electrical connectors.

In various embodiments of the cycle according to the invention, one or more of the following arrangements may possibly be used (possibly independently of each other and independently of the above arrangements):
 the receptacle is secured to the handlebar so as to impart a predetermined inclination to said receptacle, such that said front end is raised relative to said back end in the normal usage position of the cycle;
 the receptacle is shaped like a cradle having a bottom connecting the two lateral flanges, said receptacle being open at the top between the two lateral flanges;
 the bottom of the receptacle comprises visual cues to guide the user in inserting the battery into the receptacle;
 the bottom of the receptacle comprises at least one supporting rib parallel to the lateral flanges of the receptacle, the battery resting on this supporting rib when said battery is engaged in the receptacle;
 the electrical connectors of the lateral flanges comprise power circuit connectors and data circuit connectors;
 the lateral flanges of the receptacle and the first sides of the battery comprise retaining means suitable for retaining the battery by snap-fitting when the battery is engaged in the receptacle;
 the lateral flanges of the receptacle each comprise a pair of superposed parallel ribs defining a groove between them in which said electrical connectors of the receptacle are housed, the first sides of the battery each having a groove which receives one of said pairs of ribs, the complementary connectors of the battery being arranged in said grooves facing the electrical connectors of the receptacle (these arrangements serve to protect the electrical connectors of the receptacle and the complementary connectors of the battery);
 the battery comprises an electronic control circuit and an electronic display means controlled by said electronic control circuit, said display means being visible to the user seated on the saddle;
 the display means comprises light-emitting diodes;
 the electronic control circuit is adapted to receive battery status information and to display said status information by the display means;
 the electronic control circuit is adapted to communicate with a mobile phone comprising navigation means, the electronic control circuit being adapted to receive navigation information from the mobile phone and to display said navigation information by the display means (exploiting the fact that the battery is visible to the user; also exploiting the fact that the mobile phone and battery are usually owned by the user and can be configured in advance so that communication between the battery and mobile phone is established instantly and easily);

the handlebar comprises a carrying structure and a casing covering said carrying structure, the battery receptacle being integrated with said casing;

the battery comprises detection means adapted to detect whether the battery is connected to the cycle, and control means adapted to prevent the battery from discharging when the detecting means does not detect that the battery is connected to the cycle.

The invention also relates to an automatic storage system for cycles, comprising:

a plurality of removable rechargeable batteries, each having a flattened shape and comprising:
  first and second main faces defining between them a thickness of the battery,
  two opposing first sides,
  two opposing second sides, a plurality of electrically powered cycles each comprising:
  a frame having a saddle,
  at least one rear wheel rotatably mounted on the frame,
  a front wheel rotatably mounted on a fork integral to a handlebar, the front wheel defining a direction of advancement of the cycle, the handlebar having a central portion hinged to the frame and two lateral arms with handles,
  a removable rechargeable battery, the battery having a flattened shape and comprising:
    first and second main faces defining the thickness of the battery between them,
    two opposing first sides,
    two opposing second sides,
  a receptacle for receiving said battery and connecting it electrically,
  a plurality of fixed locking terminals to which said cycles can be locked,
  and at least one external control device adapted for selectively allowing the locking and unlocking of cycles on said locking terminals.

A system of this type is known from document FR2988068.

According to the invention, such a system is characterized in that the receptacle is on the central portion of the handlebar, in that the receptacle comprises two parallel lateral flanges facing one another, extending along the direction of advancement of the cycle between a back end and a front end, the front end being raised relative to the back end in the normal usage position of the cycle, the receptacle being open at the front and back ends of the lateral flanges, the receptacle being shaped to permit slotting the first sides of the battery by sliding the battery rearward on the lateral flanges of the receptacle starting from the the front end of said lateral flanges, and the receptacle being shaped to limit the sliding of the battery rearward when said battery is engaged in the receptacle, in that the lateral flanges of the receptacle comprise electrical connectors suitable for engaging with with complementary connectors that are part of the battery, in order to connect the battery electrically to an electrical circuit that is part of the cycle, when the battery is engaged in the receptacle, and in that the receptacle is shaped so that a user seated on the saddle can see at least part of the battery when said battery is engaged in said receptacle.

Finally, the invention also relates to an electrically powered cycle comprising:
  a frame with a saddle,
  at least one rear wheel rotatably mounted on the frame,
  a front wheel rotatably mounted on a fork integral to a handlebar, the front wheel defining a direction of advancement of the cycle, the handlebar having a central portion hinged to the frame and two lateral arms with handles,
  a removable rechargeable battery,
  a receptacle for receiving said battery and electrically connecting it,
the receptacle being on the central portion of the handlebar, the battery comprising an electronic control circuit and an electronic display means (for example light-emitting diodes) controlled by said electronic control circuit, said display means being visible to the user seated on the saddle,
the electronic control circuit being adapted to communicate with a mobile phone comprising navigation means, the electronic control circuit being adapted to receive navigation information from the mobile phone and to display said navigation information by the display means.

BRIEF DESCRIPTION OF DRAWINGS

Other features and advantages of the invention will be apparent from the following description of one of its embodiments, given by way of non-limiting example with reference to the accompanying drawings.

In the drawings.

DETAILED DESCRIPTION OF THE DISCLOSURE

In the various figures, the same references designate identical or similar elements.

Figure 1:
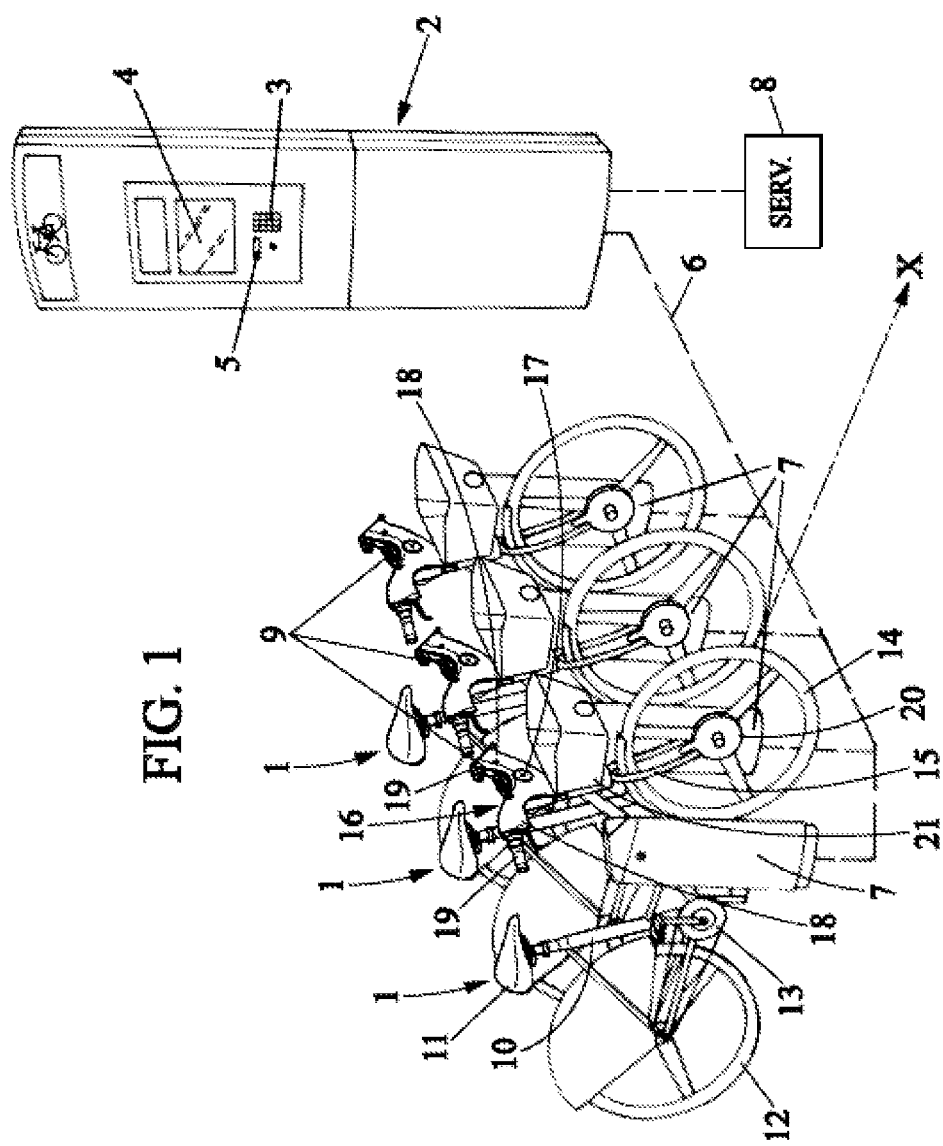
FIG. 1 is a schematic perspective view showing an automatic storage system for electrically powered cycles with removable battery, according to an embodiment of the invention.

As represented in FIG. 1, the invention relates to an automatic storage system for cycles 1, particularly such as bicycles, allowing for example the storage of cycles in public spaces so they are available for public use.

This automatic cycle storage system may comprise a plurality of cycle storage stations, of which one is represented in FIG. 1. Each cycle storage station may comprise, for example, a central terminal 2 which here is in the form of an interactive terminal having a user interface comprising for example a keyboard 3, a display 4, a reader 5 for portable memory cards, a ticket printing device, etc. Alternatively, the interactive terminal 2 may have no user interface and may be a simple communications gateway between the cycle storage station and a central server 8 (SERV).

The interactive terminal 2 communicates with the central server 8 which manages subscriptions and cycle rentals, and with a plurality of locking terminals 7 which lock the cycles when stored and which may for example be in the form of locking terminals secured to the ground in public spaces and each able to lock one cycle 1.

As represented in FIG. 1, each cycle 1 may be a power-assisted cycle operating with removable batteries 9 that are independent of the cycles, and comprising:

a frame 10 having a saddle 11, at least one rear wheel 12 rotatably mounted on the frame 10 and driven by a pedal assembly 13 which is also mounted on the frame, a front wheel 14 rotatably mounted on a fork 15 and integral with a handlebar 16 which together define a direction of advancement of the cycle X, the handlebar having a central portion 17 hinged to the frame and two lateral arms 18 with handles 19.

The front wheel may advantageously comprise a motor hub 20 incorporating an electric motor powered by the battery 9.

The fork 15 or the handlebar 16 may possibly also support a basket 21.

The electric batteries 9 of the system are removable and independent of the cycles 1. They may advantageously belong to the users, who carry their battery with them in order to recharge it at home after using a cycle.

Figure 2:
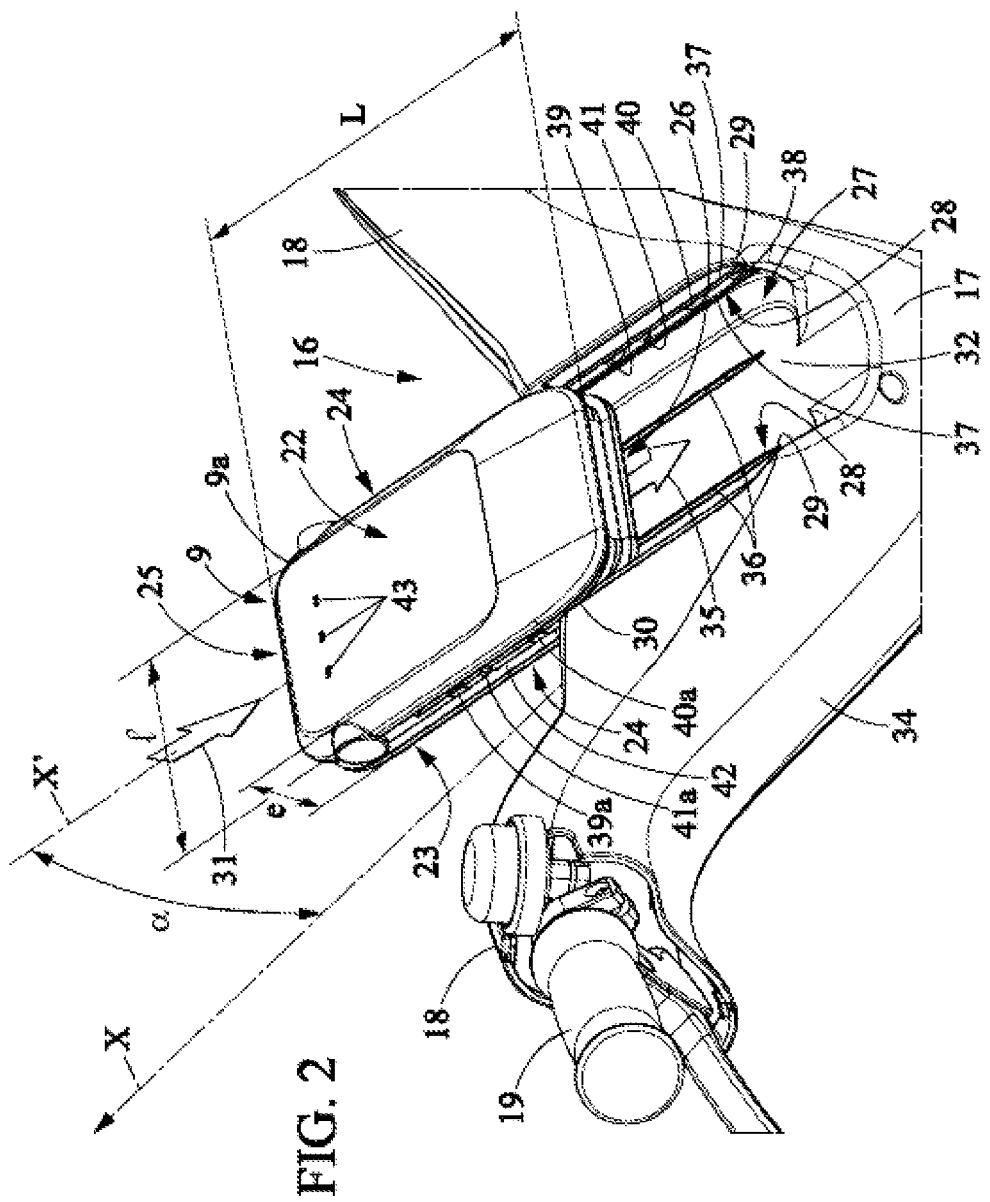
FIG. 2 is a perspective view showing the battery of one of the cycles of FIG. 1, being inserted into the battery receptacle of the cycle.
Figure 4:
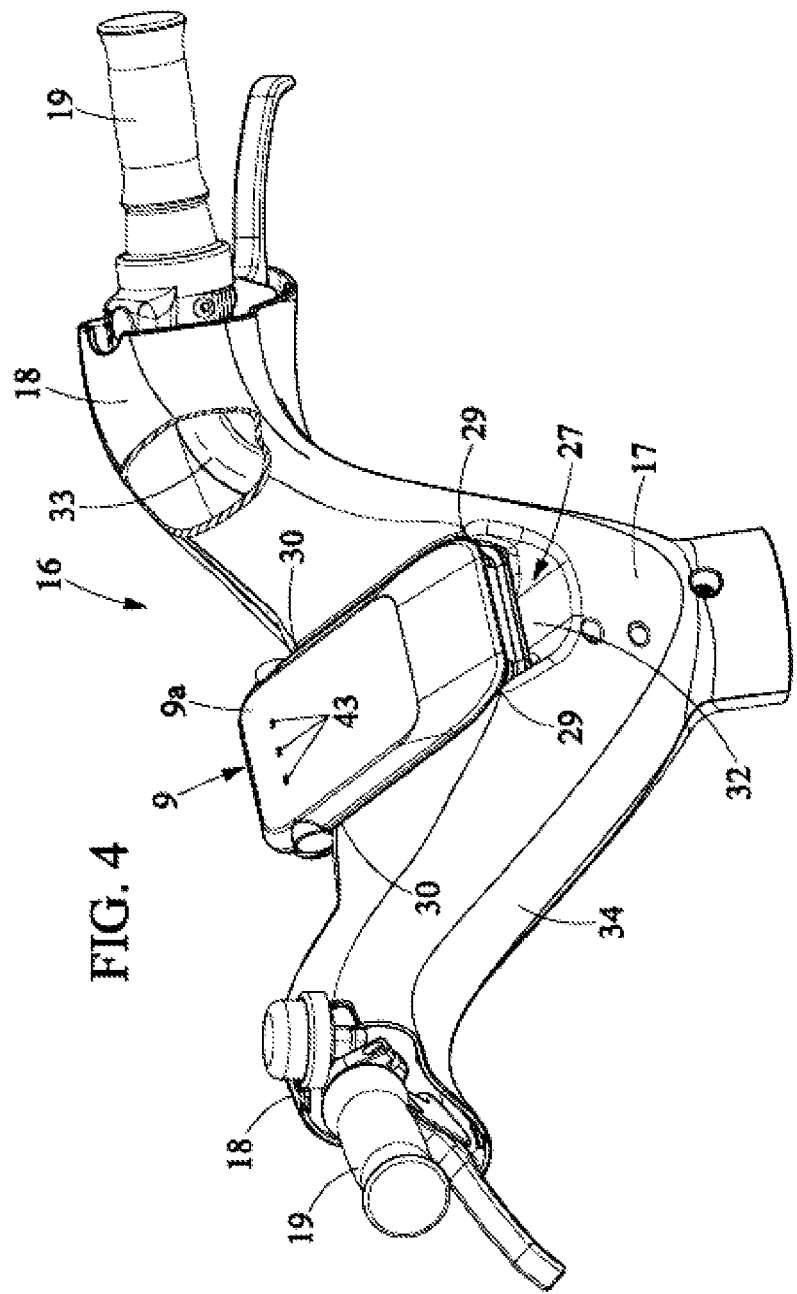
FIG. 4 is a view similar to FIG. 2, showing the battery engaged in the receptacle.

As represented in greater detail in FIGS. 2 and 4, each battery 9 may comprise an outer casing 9a, made for example of plastic. This outer casing 9a may have a flattened shape with:

first and second main faces 22, 23, respectively the upper and lower faces during normal usage of the cycle, defining between them a thickness e of the battery 9, two opposing first sides 24, for example two long sides defining a length L of the battery, two opposing second sides 25, 26, respectively the front and rear sides, for example two short sides defining a width l of the battery.

Each battery 9 may be for example a lithium battery, chosen in particular from among lithium-ion polymer batteries and lithium iron phosphate batteries, producing a voltage for example of 24 or 36 V. It may have a storage capacity for electrical energy of between 40 and 100 Wh (advantageously between 60 and 85 Wh), a weight of less than 1 kg (advantageously between 500 and 900 g), a length L of less than 20 cm (advantageously between 10 and 15 cm), a width l between 8 and 12 cm, and a thickness e between 15 and 40 mm.

Figure 3:
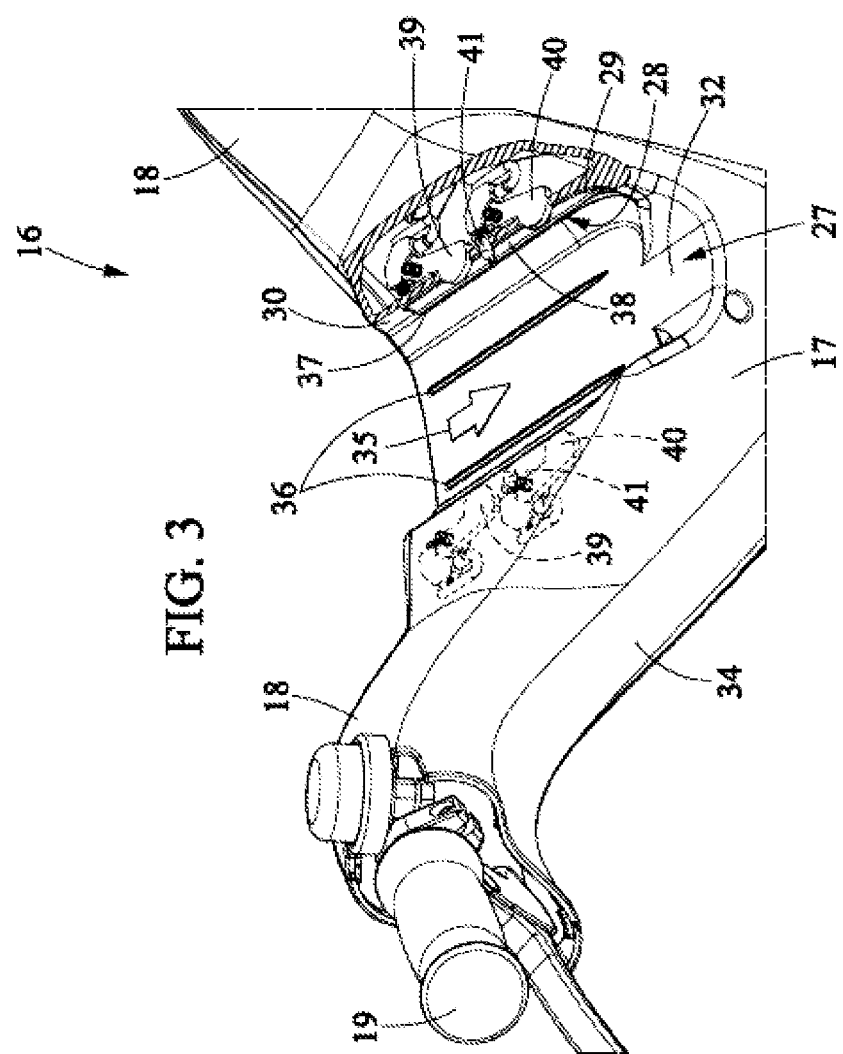
FIG. 3 is a view similar to FIG. 2, showing the battery receptacle of the cycle of FIG. 1.

Each cycle 1 comprises a receptacle 27, clearly visible in FIGS. 2 to 4, for receiving one of the batteries 9 and for electrically connecting it to the cycle.

Advantageously, the receptacle 27 is on the central portion 17 of the handlebar.

The receptacle 27 comprises two parallel lateral flanges 28 facing one another, extending in the direction of advancement X of the cycle between a back end 29 and a front end 30. The front end 30 is raised relative to the back end 29 in a normal usage position of the cycle, so that the flanges extend longitudinally in a direction X' which is in the same vertical plane as the horizontal direction of advancement X. The longitudinal direction X' of the lateral flanges 28 forms an angle α with the horizontal direction of advancement X, this angle α able to be for example between 30 and 60 degrees, for example about 45 degrees.

The receptacle 27 is secured to the handlebar 16 so as to impart the inclination of said lateral flanges 28.

The receptacle 27 is open at the front 30 and back 29 ends of the lateral flanges 28.

The lateral flanges 28 form runners adapted to cooperate in a sliding engagement with the first sides 24 of the battery 9.

The receptacle 27 is shaped to permit slotting the first sides 24 of the battery 9 by sliding the battery rearward on the lateral flanges 28 of the receptacle 27, starting from the front end 30 of said lateral flanges 28 (in the direction of the arrow 31 of FIG. 2).

The receptacle is also shaped to limit the rearward sliding of the battery 8, by abutment when said battery is engaged in into the receptacle (FIG. 3).

The receptacle is shaped so that a user seated on the saddle 11 can see at least part of the battery 9 when it is engaged in said receptacle 27.

For this purpose, the receptacle 27 may be open at the top, so that most of the battery 9 is visible to the user, especially since the lateral flanges 28 of the receptacle 27 are inclined as indicated above. This arrangement allows the user to have continuous visual verification of the battery 9, limiting the risks of improper insertion of the battery, battery theft during use, and forgetting the battery after use.

The receptacle 27 may be in form of a cradle having a bottom 32 connecting the two lateral flanges 28. The bottom 32 is inclined rearwards and downwards, preferably with a rectilinear or convex profile in a vertical plane containing the directions X, X', and with a concave profile in a plane perpendicular to direction X. This shape facilitates the draining of rainwater and the cleaning of the receptacle 27.

The bottom 32 of the receptacle may include visual indications 35 to guide the user when inserting the battery into the receptacle.

The bottom 32 of the receptacle 27 may also include at least one supporting rib 36 parallel to the lateral flanges 28 of the receptacle (for example two ribs 36), the battery 9 resting on the supporting rib(s) 36 when said battery is engaged in the receptacle 27. This leaves a free space under the battery 9, which also helps facilitate the draining of rainwater.

The handlebar 16 may comprise a support structure 33, for example a tubular metal structure (FIG. 4), and a casing 34 covering said support structure 33 and carried by it, for example a plastic casing. The receptacle 27 may be integrated with the casing 34. In particular, the receptacle 27 may be formed by a portion of the upper surface of the casing 34 in the normal usage position of the cycle 1.

The lateral flanges 28 of the receptacle 27 comprise electrical connectors 39, 40 adapted for engagement with complementary connectors 39a, 40a that are part of the first sides 24 of the battery 9, in order to electrically connect the battery 9 to the cycle 1 when the battery 9 is engaged in the receptacle 27. The electrical connectors 39, 40 may advantageously be distributed between both lateral flanges 28 on the two sides of the receptacle 27. For example, the electrical connectors 39, 40 of the lateral flanges comprise power circuit connectors 39 respectively arranged in the two lateral flanges 28 and data circuit connectors 40 respectively arranged in the two lateral flanges 28. The electrical connectors 39, 40 may for example be elastic metal contacts or rigid metal contacts elastically urged towards the interior of the receptacle, against the complementary connectors 39a, 40a of the battery.

The lateral flanges of the receptacle 28 and the first sides 24 of the battery may further comprise retaining means 41, 41a adapted to retain the battery 9 by a locking engagement when the battery is engaged in the receptacle 27. These retaining means may, for example, comprise beads or the like mounted in the lateral flanges 28 and movable between a position protruding into the receptacle 27 and a position retracted within the lateral flange 27, said beads being elastically biased toward the protruding position. In this case, the retaining means may also comprise recesses 41a in the first edges 24 of the battery and adapted to receive the beads 41.

In a preferred embodiment, the lateral flanges 28 of the receptacle may each comprise a pair of superposed parallel ribs 37 which protrude horizontally into the receptacle 27 and define a groove 38 between them in which said electrical connectors 39, 40 of the receptacle and where appropriate the retaining means 41 are housed. Advantageously, the ribs 37 completely cover the connectors 39, 40 and where appropriate the retaining means 41, so as to provide maximum protection against impacts and soiling. Each first side 24 of the battery may include a groove 42 which receives one of said pairs of ribs 37. The complementary connectors 39a, 40a of the battery are arranged in said grooves 42 opposite the electrical connectors 39, 40 of the receptacle, and the recesses 41a of the battery are arranged in said grooves 42 facing the beads 41.

Advantageously, the battery 9 may include display means, for example light-emitting diodes 43, controlled by an electronic battery control circuit which will be described below.

The electrical operation of the cycle is controlled by a cycle control device 50 represented in FIG. 5, which will be referred to below as a control unit 50 or UC. This control unit 50 may be an integrated device or a combination of circuit boards possibly distributed to a plurality of locations in the cycle 1, for example in the casing 34 and/or in a housing arranged in the basket 21 (in this case, the housing in question may for example be attached to the bottom and/or to one or more side walls of the basket 21).

Figure 5:
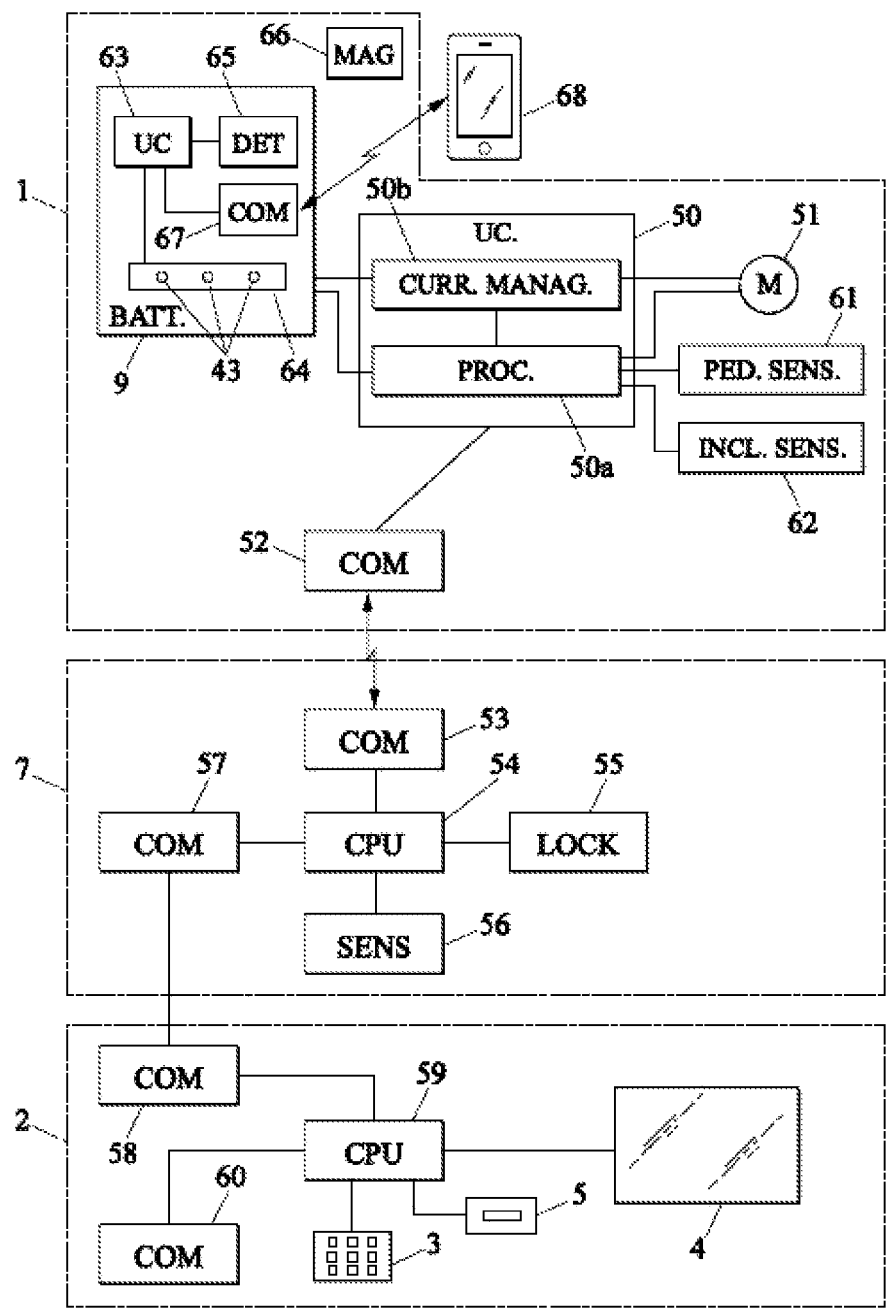
FIG. 5 is a block diagram illustrating the main electrical components of the cycle storage system of FIG. 1.

In the example of FIG. 5, the control unit 50 comprises a processor 50a (PROC) and a power management unit 50b (CURR MANAG).

The power management unit 50b is connected firstly to the battery 9 by the above-mentioned power circuit connectors 39 (and possibly to a fixed battery permanently mounted on the cycle 1), and secondly to an electric motor 51 (M), for example an electric motor for pedal assistance that is for example part of said motor hub 20. The motor 51 may for example provide normalized power of about 250 W, and operate with a voltage of for example 24 or 36 V to the motor 51. The power management unit 50b is controlled by the processor 50a to manage operation of the motor 51.

The processor 50a can be also connected, in particular:
to a central processing unit 63 (CPU) that is part of the battery 9, by means of said data circuit connectors 40),
to the motor 51, particularly so as to receive a rotation speed measurement for said motor,
to a pedaling sensor 61 (PED SENS), known per se, for receiving a measurement of the torque applied to the pedal assembly 13 by the user and a measurement of the rotation speed of the pedal assembly 13,
and preferably to an inclination sensor 62 (INCL SENS) adapted to measure an inclination of the cycle 1 (and therefore of the ground) in the direction of advancement X.

The processor 50a also controls a communication interface 52 (COM) which is adapted for communicating with a similar communication interface 53 (COM) that is part of each locking terminal 7. The communication interfaces 52, 53 may be of any known type, and operate for example over wires, by induction, by radio waves, or by some other method.

The communication interface 53 of the locking terminal 7 can communicate with a central processing unit 54 (CPU) specific to the locking terminal 7 (microprocessor, microcontroller, or other), said CPU 54 controlling an electric lock 55 (LOCK—an example of such a lock is disclosed for example in document EP-A-1 820 722) suitable for locking a cycle on the locking terminal 7, and communicating with at least one sensor 56 (SENS) adapted for detecting the locking of a cycle 1 on the locking terminal 7, and a communication interface 57 (COM), such as a modem adapted for communicating by means of wires 6 (FIG. 1) or by a short range radio link or in any other manner, with a similar communication interface 58 (COM) that is part of the above-mentioned interactive terminal 2.

The interactive terminal 2 also comprises a central processing unit 59 (CPU) such as a microprocessor, microcontroller, or the like, which communicates with the above-mentioned devices 3-5 as well as with a communication interface 60 (COM) such as a modem communicating by radio or by means of wires with said central server 8.

The control unit 63 of the battery controls the display 64, consisting for example simply of said light-emitting diodes 43, which here for example are three in number.

The control unit 63 of the battery may be adapted to receive status information about the battery 9 (for example the charge level, malfunctions, etc.) and to display said status information on the display 64. By way of non-limiting example, the light-emitting diodes 43 may flash upon detection of battery 9 failure or insufficient charge, or the central processing unit 63 may turn on a certain number of light-emitting diodes 43 depending on the charge level.

The central processing unit 63 of the battery may be further connected to a detector 65 (DET) suitable for detecting that the battery is connected to the cycle 1. The detector 65 may, for example, be a magnetic sensor adapted to provide a detection signal when it is opposite a magnet 66 (MAG) integrated for example into or under the bottom 32 of the receptacle 27. The central processing unit 63 of the battery can advantageously be adapted to prevent the battery from being discharged 9 when the detector 65 does not detect the connection of the battery 9 to the cycle 1.

The control unit 63 of the battery may be further connected to a communication interface 67 (COM) adapted for communicating with a radiocommunicating mobile phone 68 ("smartphone" or the like) owned by the user. The communication interface 67 may, for example, be a radio interface, including Bluetooth or some other type.

This communication between the control unit 63 and the mobile phone 68 can allow sending personalized information to the mobile phone 68 concerning the operation of the battery 9 and the use of the cycle 1. This communication can also allow controlling the operating mode of the cycle 1 from the mobile phone 68, particularly the type of power assistance provided by the motor 51.

When the mobile phone comprises navigation means, this communication allows the mobile phone 68 to provide navigation information to the control unit 63, which can display it in a simple manner on the display 64. For example, light-emitting diodes 43 may be arranged in a horizontal line, and the CPU 63 flashes the diodes 43 on the right when the cycle is to turn right and the diodes 43 on the left when the cycle is to turn left.

The device just described operates as follows: When a user wishes to borrow a cycle 1 from the station, the user identifies himself or herself on the interactive terminal 2 or by any other known means, so as to select a cycle 1 and release it from its locking terminal 7, in a manner known per se, and the user brings a charged battery 9 that he or she inserts into the receptacle 27 of the cycle.

After use, the user returns the cycle 1 to a cycle storage station (which may be the one where the cycle was borrowed or some other station) by locking it back onto a locking terminal 7 of the station, in a manner also known per se. When the cycle 1 has been locked to the locking terminal 7, the locking terminal 7 detects this locking by means of the sensor 56 and sends the information to the cycle 1 through communication interfaces 53 and 52 and to the interactive terminal 2 via communication interfaces 58 and 57.

The invention claimed is:

1. An electrically powered cycle comprising:
   a frame having a saddle,
   at least one rear wheel rotatably mounted on the frame,
   a front wheel rotatably mounted on a fork integral to a handlebar, the front wheel defining a direction of advancement of the cycle, the handlebar having a central portion hinged to the frame and two lateral arms with handles,
   a removable rechargeable battery having a flattened shape and comprising:
   first and second main faces defining a thickness of the battery,
   two opposing first sides,
   two opposing second sides,
   a receptacle for receiving said battery and connecting said battery electrically, the receptacle being on the central portion of the handlebar, the receptacle comprising two parallel lateral flanges facing one another, extending along the direction of advancement of the cycle between a back end and a front end, the receptacle being open at the front end of the lateral flanges, the receptacle being shaped to permit slotting the first sides of the battery by sliding the battery rearward on the lateral flanges of the receptacle from the front end of said lateral flanges, and the receptacle being shaped to limit the rearward sliding of the battery when said battery is engaged in the receptacle, and the receptacle being shaped so that a user seated on the saddle can see at least part of the battery when said battery is engaged in said receptacle,
   wherein said front end is raised relative to said back end in the normal usage position of the cycle, the receptacle being open at the back end of the lateral flanges,
   and the lateral flanges of the receptacle comprise electrical connectors suitable for engaging with complementary battery connectors that are part of the battery, in order to connect the battery electrically to an electrical circuit that is part of the cycle, when the battery is engaged in the receptacle.

2. The cycle according to claim 1, wherein the receptacle is secured to the handlebar so as to impart a predetermined inclination to said receptacle, such that said front end is raised relative to said back end in the normal usage position of the cycle.

3. The cycle according to claim 1, wherein the receptacle is shaped like a cradle having a bottom connecting the two lateral flanges, said receptacle being open upwards between the two lateral flanges.

4. The cycle according to claim 3, wherein the bottom of the receptacle comprises visual clues to guide the user n inserting the battery into the receptacle.

5. The cycle according to claim 3, wherein the bottom of the receptacle comprises at least one supporting rib parallel to the lateral flanges of the receptacle, the battery resting on said supporting rib when said battery is engaged in the receptacle.

6. The cycle according to claim 1, wherein the electrical connectors of the lateral flanges comprise power circuit connectors and data circuit connectors.

7. The cycle according to claim 1, wherein the lateral flanges of the receptacle and the first sides of the battery comprise retaining means suitable for retaining the battery by snap-fitting when the battery is engaged in the receptacle.

8. The cycle according to claim 1, wherein the lateral flanges of the receptacle each comprise a pair of superposed parallel ribs defining a groove between said ribs in which said electrical connectors of the receptacle are housed, the first sides of the battery each having a groove which receives one of said pairs of ribs, the complementary battery connectors being arranged in said grooves facing the electrical connectors of the receptacle.

9. The cycle according to claim 1, wherein the battery comprises an electronic control circuit and an electronic display means controlled by said electronic control circuit, said display means being visible to the user seated on the saddle.

10. The cycle according to claim 9, wherein the display means comprises light-emitting diodes.

11. The cycle according to claim 9, wherein the electronic control circuit is adapted to receive status information for the battery and to display said status information by the display means.

12. The cycle according to claim 9, wherein the electronic control circuit is adapted to communicate with a mobile phone comprising navigation means, the electronic control circuit being adapted to receive navigation information from the mobile phone and to display said navigation information by the display means.

13. The cycle according to claim 1, wherein the handlebar comprises a carrying structure and a casing covering said carrying structure, the receptacle of the battery being integrated with said casing.

14. The cycle according to claim 1, wherein the battery comprises detection means adapted to detect whether the battery is connected to the cycle, and control means adapted to prevent the battery from discharging when the detecting means does riot detect that the battery is connected to the cycle.

* * * * *